(12) United States Patent
D'Annunzio (10) Patent No.: US 7,003,293 B2
(45) Date of Patent: Feb. 21, 2006

(54) NETWORK SYSTEM HAVING MULTIPLE SUBNETS FOR A MOBILE PLATFORM

(75) Inventor: Michael A. D'Annunzio, Redmond, WA (US)

(73) Assignee: The Boeing Company, Chicago, IL (US)

( * ) Notice: Subject to any disclaimer, the term of this patent is extended or adjusted under 35 U.S.C. 154(b) by 705 days.

(21) Appl. No.: 10/175,261

(22) Filed: Jun. 18, 2002

(65) Prior Publication Data

US 2003/0084130 A1 May 1, 2003

Related U.S. Application Data

(60) Provisional application No. 60/335,532, filed on Oct. 23, 2001.

(51) Int. Cl.
*H04Q 7/00* (2006.01)

(52) U.S. Cl. ....................................... 455/431; 709/246
(58) Field of Classification Search ................. 455/431; 709/245, 246; 370/395.52
See application file for complete search history.

(56) References Cited

U.S. PATENT DOCUMENTS 6,760,778 B1 * 7/2004 Nelson et al. .............. 709/246

OTHER PUBLICATIONS

Hinden R et al: "RFC 1884—IP Version 6 Addressing Architecture", Request for Comments, Dec. 1995, XP002234214; paragraphs '02.1!, '02.41, '2.4.1!.

Tanenbaum, Andrew: "Computer Networks" 1996, Prentice Hall, New Jersey XP002238844; paragraph '5.5.3.!; figure 5.49.

Halabi, Bassam: "Internet Routing Architectures" 1997, Cisco Press, Indianapolis XP002238845, p. 57, line 16—p. 59, line 3.

Jain, Raj: "FDDI Handbook" Feb. 1994, Addison Wesley Publishing Company XP002238846 p. 42, line 6—p. 42, line 9.

* cited by examiner

*Primary Examiner*—Nick Corsaro
(74) *Attorney, Agent, or Firm*—Harness Dickey & Pierce P.L.C.

(57) ABSTRACT

A method for assigning Internet Protocol addresses in a communications system for an aircraft according to the invention includes the steps of creating an air-to-ground network (AGN), a passenger services network (PSN), and a command and control network (CCN). A first range of addresses is assigned to a first group of devices that are associated with the AGN. A second range of addresses is assigned to a second group of devices that are associated with the PSN. A third range of addresses is assigned to a third group of devices that are associated with the CCN. IP aliasing is employed to allow at least one device from the first, second and third groups to be multi-homed.

33 Claims, 5 Drawing Sheets

| Device | Device Number Range |
|---|---|
| DTR | 1 - 6 |
| Port Address Translation Addresses | 7 - 8 |
| Area Distribution Boxes | 9 - 24 |
| Seatboxes | 25 - 424 |
| Web/Media/Other Servers | 425 - 432 |
| Crew Information System Servers | 433 - 442 |
| Aircraft Interface Unit | 443 |
| Control Panels | 444 - 450 |
| Laptop Power Controllers | 954 - 969 |
| Expanded Services Devices | 970 - 989 |
| HCA | 990 - 1005 |
| Business Jet Receivers | 1006 - 1009 |
| ASPAC | 1010 |

FIG. 5

| Server Type | Type Number |
|---|---|
| Web/Media/Other Servers | 1 |
| Crew Information System Servers | 2 |
| Control Panel | 3 |
| Expanded Services Server | 4 |

FIG. 6

| Network Element Type | Type Number |
|---|---|
| Router | 1 |
| Transmitter | 2 |
| Receiver | 3 |
| Area Distribution Box | 4 |
| Aircraft Interface Unit | 5 |
| Laptop Power Controller | 6 |
| HCA | 7 |
| Business Jet Receiver | 8 |
| ASPAC | 9 |

NETWORK SYSTEM HAVING MULTIPLE SUBNETS FOR A MOBILE PLATFORM

FIELD OF THE INVENTION

The present invention relates to networks for mobile platforms, and more particularly to an Internet Protocol (IP) addressing scheme for mobile platforms.

BACKGROUND OF THE INVENTION

Broadband communications access, on which our society and economy is growing increasingly dependent, is not readily available to users on board mobile platforms such as aircraft, ships, and trains. While the technology exists to deliver the broadband communications services to mobile platforms, conventional solutions are currently commercially unfeasible due to the high costs for service or due to low data rates. The conventional solutions have typically only been available to government/military users and/or to high-end maritime markets such as cruise ships. To attract business users, the broadband communication services must provide acceptable data rates at a reasonable price. The broadband communications services must also be designed within guidelines that are required for networks or nodes that are connected to the Internet.

Internet web sites are identified by a public address. Routers and switches use the public address to route IP packets. Public addresses are considered a scarce resource. Requests for public address space from American Registry for Internet Numbers (ARIN) are scrutinized for efficient usage. For example, aircraft Internet systems will require a significant number of IP addresses for routers, servers, users, and other hosts.

SUMMARY OF THE INVENTION

A method for assigning Internet Protocol addresses in a communications system for an aircraft according to the invention includes the steps of creating an air-to-ground network (AGN), a passenger services network (PSN), and a command and control network (CCN). A first range of addresses is assigned to a first group of devices that are associated with the AGN. A second range of addresses is assigned to a second group of devices that are associated with the PSN. A third range of addresses is assigned to a third group of devices that are associated with the CCN. IP aliasing is employed to allow at least one device from the first, second and third groups to be multi-homed.

In other features of the invention, the first range of addresses define a network number and a host number. The host number is divided into an aircraft number for subnetting and a device number.

In still other features, a second range of addresses includes a network number and a host number. The host number includes a first group of bits that identify one of a seat electronic box device, a server element and a network element. A second group of bits identifies an area distribution box. A third group of bits identifies a column. The host number includes a fourth group of bits that identify a seat electronic box. In a first alternate, the host number includes a fifth group of bits that identify a type of server that is to be addressed and a sixth group of bits that identify a server device. In a second alternate, the host number includes a seventh group of bits that identify a type of network that is to be addressed and an eighth group of bits that identify a network device.

In still other features of the invention, the third range of addresses includes two addresses that are super-netted together. The third range of addresses include a network number and a host number. The host number includes bits that identify an area distribution box, a column, a seatbox, a user, and a port.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
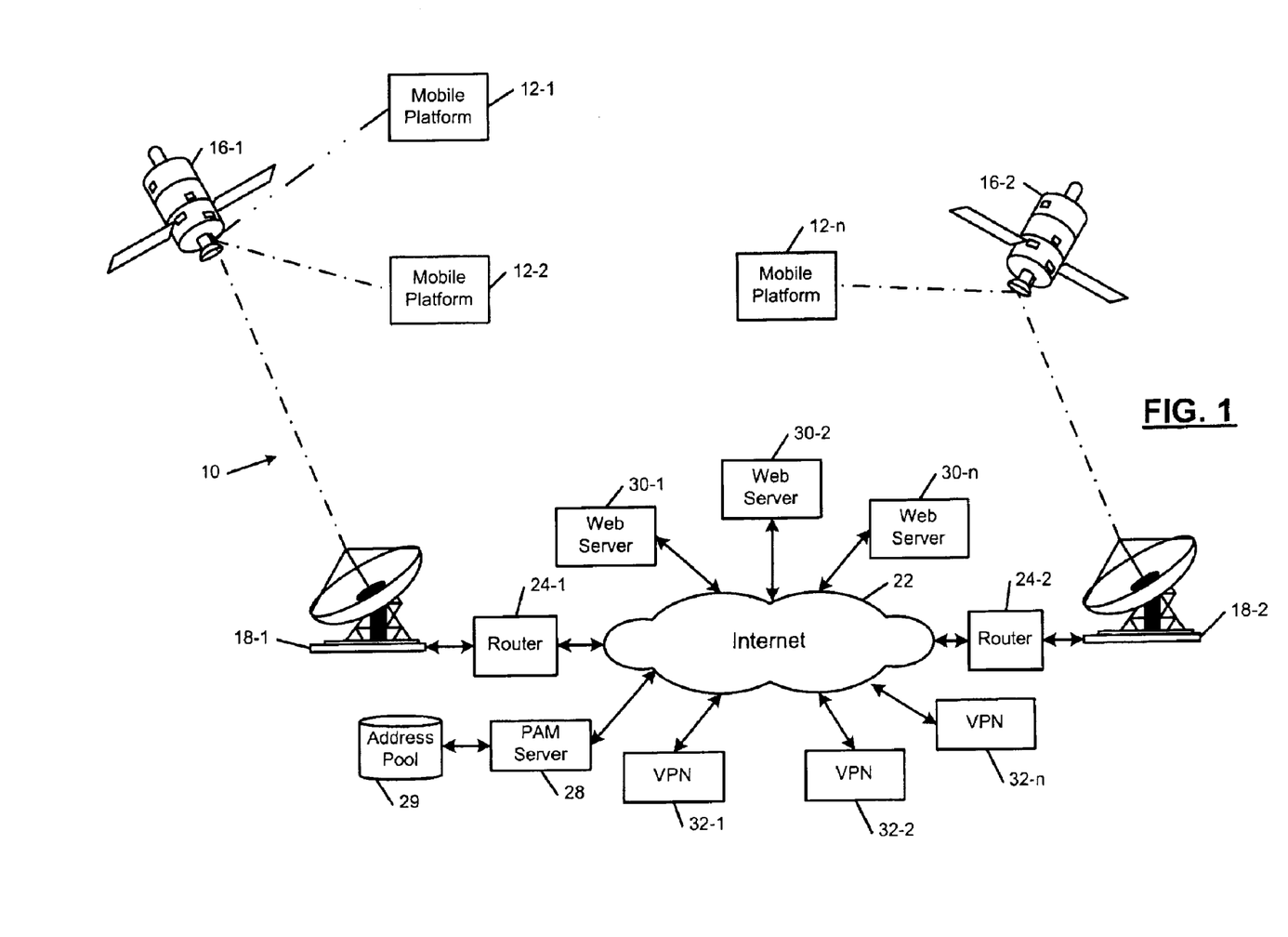
FIG. 1 is a functional block diagram illustrating a broadband communications system including mobile platforms, satellites, ground stations and the Internet.

Referring now to FIG. 1, a mobile platform communications system 10 for mobile platforms 12-1, 12-2, . . . , and 12-n is shown. The mobile platforms 12 communicate via one or more satellites 16-1, 16-2, . . . , and 16-n and with one or more ground-based receiving stations 18-1, 18-2, . . . , and 18-n. The ground-based receiving stations 18 are connected to a distributed communications system 22 via a router 24-1, 24-2, . . . , and 24-n. A public address manager (PAM) server 28 is connected to the distributed communications system 22, the router 24 or to the ground-based receiving stations 18. If used, the PAM server 28 manages the leasing of public addresses that are stored in a public address pool 29 to the mobile platforms 12.

One or more web servers 30-1, 30-2, . . . , and 30-n are connected to the distributed communications system 22. Likewise, one or more virtual private networks (VPNs) 32-1, 32-2, . . . , and 32-n are connected to the distributed communications system 22. The distributed communications system 22 is preferably the Internet. Users located on the mobile platform 12 access the web servers 30 and/or the VPN's 32 via the mobile platform communications system 10. As can be appreciated, the mobile platform establishes an air-to-ground network via the satellites 16 and the ground stations 18.

Figure 2:
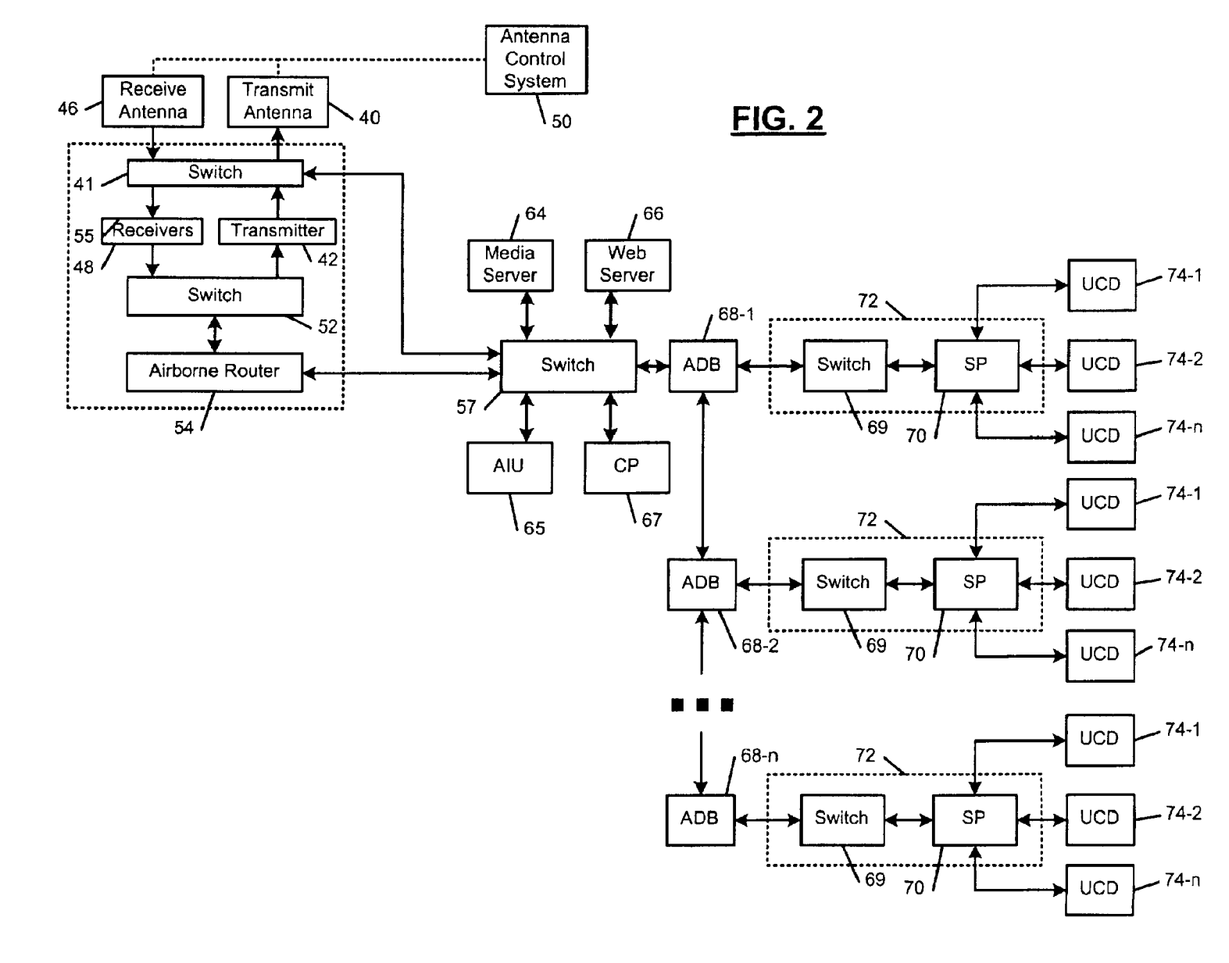
FIG. 2 is a functional block diagram illustrating a mobile platform communications system in more detail.

Referring now to FIG. 2, the mobile platform 12 includes a transmit antenna 40 that is connected by a switch 41 to a transmitter 42 and a receive antenna 46 that is connected by the switch 41 to a receiver 48. The transmit and receive antennas 40 and 46 are controlled by an antenna control system 50. The receiver 48, the transmitter 42, the switch 41, a switch 52 and an airborne router 54 are collectively referred to as a data transceiver router (DTR) 55.

The airborne router 54 is connected to a switch 57 that is connected to servers 64, 65, 66, and 67. The servers 64-67 provide web services, media services, an aircraft interface unit (AIU), a control panel (CP), and other server functions. For example, the servers provide flight specific websites such as car rental companies located at the destination, popular web sites such as CNN, MSN, etc. that are stored in cache, targeted advertising, and other content. One or more additional servers and/or functions may also be provided. The switch 57 is connected to one or more area distribution boxes (ADBs) 68-1, 68-2, . . . , and 68-n. The ADBs 68 are connected to one or more seat processors 70 that are connected to one or more user communication devices UCD 74-1, 74-2, . . . , and 74-n. A switch 69 and the seat processor 70 are collectively referred to as a seat electronic box (SEB) 72. The UCD 74 is a laptop computer, a personal digital assistant PDA, or any other electronic device that communicates via the Internet. The UCDs 74 preferably include a microprocessor, memory (such as random access memory, read-only memory, and/or flash memory), and input/output devices such as a keyboard, a mouse, and/or a voice operated interface. In a preferred embodiment, the mobile platform communications system 10 establishes point-to-point over Ethernet (PPPoE) sessions between the UCDs 74 and the airborne router 54.

Figure 3:
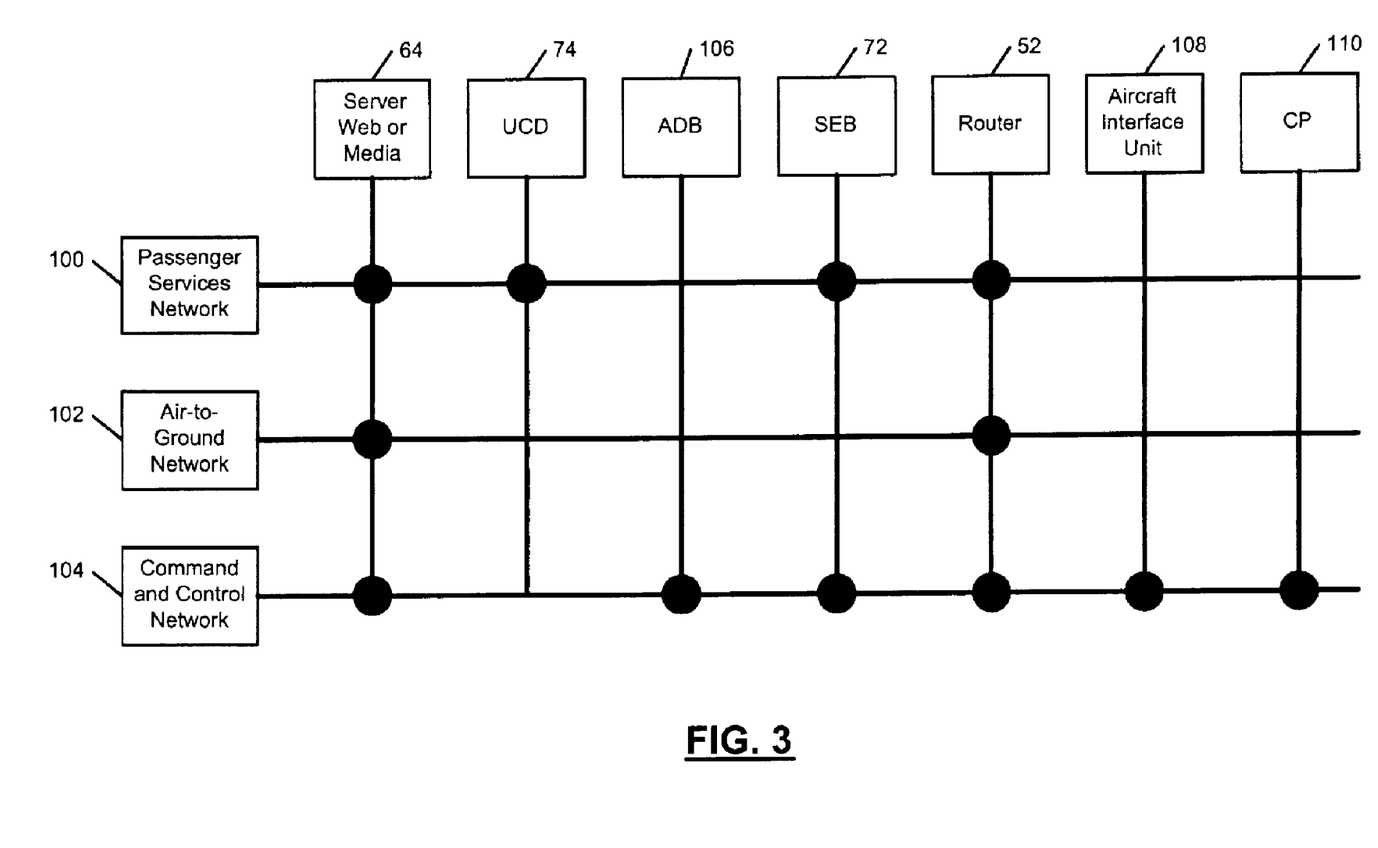
FIG. 3 illustrates the connectivity between a passenger services network, an air-to-ground network and a command and control network.

Referring now to FIG. 3, the communication system 10 according to the present invention includes three or more logical subnets: a passenger services network (PSN) 100, an air-to-ground network (AGN) 102 and a command and control network (CCN) 104. For example, the servers 64 and 66 that provide web or media services are preferably multi-homed in that they have multiple physical interfaces. The UCDs 74 are connected to the PSN 100. IP aliasing allows multiple IP addresses to be configured on the same physical interface. The IP addresses can be from the same or different subnets. Multiple logical subnets can be created on the same physical network. Since only a router can forward traffic between subnets, logical subnets simplify router and host-based packet filtering to control inter-subnet access. Logical subnets allow access to actual application ports to be restricted to specific subnets. Logical subnets allow maximum use of private address ranges and reuse of address ranges between module platforms. Logical subnets minimize the number of subnets that must be advertised to the ground.

More particularly, the AGN 102 is defined as the network that provides connectivity between the onboard IP management interfaces on each network element (such as routers, switches, servers, and seat boxes) and the ground. Data that is expected to use the AGN 102 includes simple network management protocol (SNMP) traffic, content pushed from the ground to the aircraft, billing information, maintenance data of the network elements, port address translation of passenger addresses for off-board aircraft connectivity and other similar data traffic.

A first part (or network number) of an IP address typically identifies a network on which a host resides. A second part (or host number) identifies the particular host on the network. To support different sized networks, the IP address space is split into three address classes. A Class A IP address typically includes an 8-bit network number and a 24-bit host number. Class A IP addresses are currently assigned a dotted decimal address in the range between 1.xxx.xxx.xxx and 126.xxx.xxx.xxx. A Class B IP address includes a 16-bit network number and a 16-bit host number. Class B IP addresses are currently assigned a dotted decimal address in the range between 128.0.xxx.xxx and 191.255.xxx.xxx. A Class C IP address includes a 24-bit network number and an 8-bit host number. Class C IP addresses are currently assigned a dotted decimal address in the range between 192.0.0.xxx and 223.255.255.xxx.

Air-to-Ground Network

The AGN 102 preferably employs a Class A IP address. The host number is further broken down into a subnet number and a sub-host number to more effectively use the IP address space. In the mobile platform addressing scheme according to the invention, the IP addresses for the AGN 102 include a network number, a subnet number that is equal to an aircraft identification number and a sub-host number that is equal to a device number. The aircraft identification number is a 14-bit number that allows 16,382 aircraft to be uniquely addressed from the ground. This addressing approach provides sufficient address space for commercial passenger aircraft and can also be used to extend this service to additional sectors.

Private addressing is used to reduce the need for public Internet routable IP addresses that are difficult to obtain. The 14-bit aircraft identifier doubles as the subnet number to allow routed communications between the plane and the ground. The second part of the IP address is the device or host number. The device or host number provides 10-bits of device address space. The range of device numbers preferably starts with device number 1 (the device number 0 is not used) and ends with the device number 1022. These limitations reduce the possibility of assigning an address that conflicts with the broadcast address of the subnet. The device or host numbers are further separated into the ranges listed in the table shown in FIG. 4.

Figure 4:
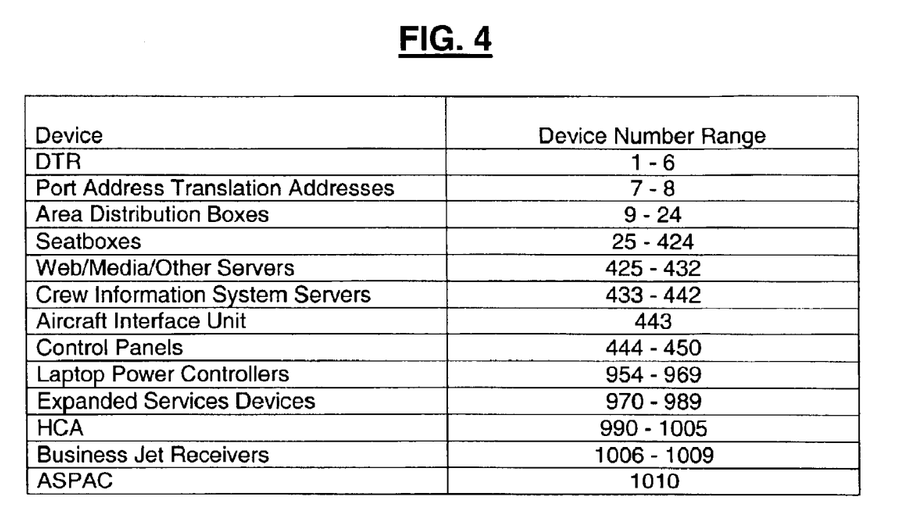
FIG. 4 is a table that defines a relationship between devices and device numbers in the air-to-ground network.

Referring now to FIG. 4, a first range, including 1 to 6, is assigned to devices or hosts that route management traffic between the air and the ground. The devices or hosts in the first range preferably include the DTR 55 and other transmit/receive devices that are located between the air and the ground. A second range, including 7 and 8, is assigned to Port Address Translation (PAT) of onboard passenger addresses to the ground. PAT changes a source IP address and a source port to allow a large number of devices to use a single IP address. Two addresses are used to ensure that PAT does not run out of addresses.

A third range, including 9 to 24, corresponds to a management interface of the ADBs 68. A fourth range, including 25 to 424, is used for UCDs 74. With this approach, there can be a maximum of 16 ADBs. Each ADB has 5 columns with 30 SEBs. Up to 2400 UCDs 74 can be supported. This is unlikely to occur if the mobile platform is an aircraft since the maximum number of passengers that are expected for the largest aircraft is 800. 400 addresses have been reserved for UCDs.

A fifth range of addresses, including 425 to 432, corresponds to servers such as the media server 64, web server 66 and/or servers for other services. A sixth range, including 433 to 422, is reserved for crew information system devices. The aircraft interface unit (AIU) 65 is assigned address 443. Control panels (CP) 67 are assigned a seventh address range including 444 to 450. Laptop power controllers are assigned device addresses in an eighth range including 954 to 969.

To allow for future deployment of expanded services, addresses in a ninth range, including 970 to 989, are reserved for servers and delivery service devices. A tenth range, including 990 to 1005, allows communication between legacy equipment and IP enabled equipment. Business jets have an additional four receivers that are assigned addresses in an 11th range including 1006 to 1009. Finally, to allow communication between the DTR 55 and the antenna control/system 50 in the future, address 1010 is reserved. The overall address scheme can be summarized as follows:

```
[10.]  [AAAAAAAAAAAAAA-NNNNNNNNNN]

8-Bits         14-Bits              10-Bits
```

-continued

```
[10.]  [AAAAAAAA.AAAAAANN.NNNNNNNN]
```

A=Airplane Identifier
N=Device Number
Subnet Mask: 255.255.252.0 (/22)

Command and Control Network

All servers, routers, and SEBs communicate on the command and control network (CCN) 104. The CCN 104 preferably employs a class B IP address with a 16-bit network number and a 16-bit host number. The CNN 104 is assigned the network number 172.16.0.0. This network has been further partitioned to allow quick identification of elements (the partitioning is not the same as subnetting). The first four bits of the host number are used to identify classes of devices. The first bit is unused and is set equal to 0. The first bit may be used to provide an additional 32,766 addresses to support IP addresses of other equipment that participates on the CCN 104. The next three bits following the first bit of the host number are used to define the CCN device that is being addressed. These three bits are referred to as the "L" bits below. For example, the three bits can be defined as follows: "100" is a SEB element; "010" is a server element, and "001" is a network element.

```
[172.16] [x-LLL-Depends on "L" Bits]
[172.16] [0LLL????.????????]
``` x=not used (set to "0")
L=Command and Control Device Type (where, "100"= Seatbox Element; "010"=Server Element; "001"= Network Element)
?=Depends on the "L" bits

CCN-SEB Addressing

The address [172.16][0100????.????????] is that of the CCN interface of the SEB 72, which is used for initialization and onboard control of the SEB 72. As with all CCN devices, the first bit is unused and is set equal to 0. The next three bits are used to define the type of CCN device that is being addressed. In the case of the SEB 72, the bit pattern is set equal to 100. To uniquely address each SEB 72, the next 4 bits are used to define the ADB 68 that the SEB 72 is connected to. This will allow up to 16 ADBs 68 to be described. The first ADB 68 starts with the number 0. The next 3 bits are used to define the column of the ADB 68 that the seatbox is connected to. Three bits are used to allow up to 5 columns per ADB 68 to be addressed. The first column is addressed as 1. The last bits define the position of the SEB 72 with respect to the column. Five bits are allocated to allow up to 30 seatboxes to be defined. The first seatbox is addressed as 1. This is summarized as follows:

```
[172.16]    [x-LLL-DDDD-CCC-BBBBB]

16-Bits   1-Bit 3-Bits   4-Bits 3-Bits    5-bits

[172.16]    [OLLDDDD.CCCBBBBB]
``` x=not used (always set to "0")
L=Command and Control Device Type (where, "100"= Seatbox Element; "010"=Server Element, "001"= Network Element)
D=Area Distribution Box
C=Column
B=Seatbox
Subnet Mask: 255.255.0.0 (/16)

CCN-Server Elements

Figure 5:
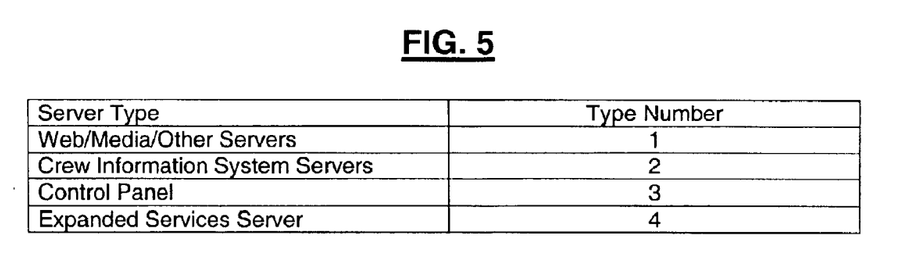
FIG. 5 is a table that defines a relationship between the onboard servers and type number.

The server element address is the CCN address of any device that provides a service to the PSN 100. This may include web servers, content servers and any other server that may be defined in the future. The address is used for initialization, maintenance, and onboard control of the servers and is not part of the PSN 100. As with all CCN elements, the first bit is preferably unused and is set equal to 0. The next three bits are used to define the type of CCN device that is being addressed. In the case of a server element, the bit pattern is set to "010". To allow different types of servers to be defined and identified by IP addresses, the next 7 bits are used to specify the type of server being addressed starting with a type of 1. FIG. 5 lists on-board server type numbers. The final 5 bits allow up to 31 servers to be defined for each type. The server device number starts at 1. This is summarized as follows:

```
[172.16] [x-LLL-TTTTTTT-NNNNN]

16-Bits    1-Bit 3-Bits       7-Bits      5-Bits

[172.16]     [OLLLTTTT.TTTNNNNN]
``` x=not used (always set to "0")
L=Command and Control Device Type (where, "100"= Seatbox Element; "010"=Server Element, "001"= Network Element)
T=Server Type
N=Server Number
Subnet Mask: 255.255.0.0 (/16)

CCN-Network Elements

Figure 6:
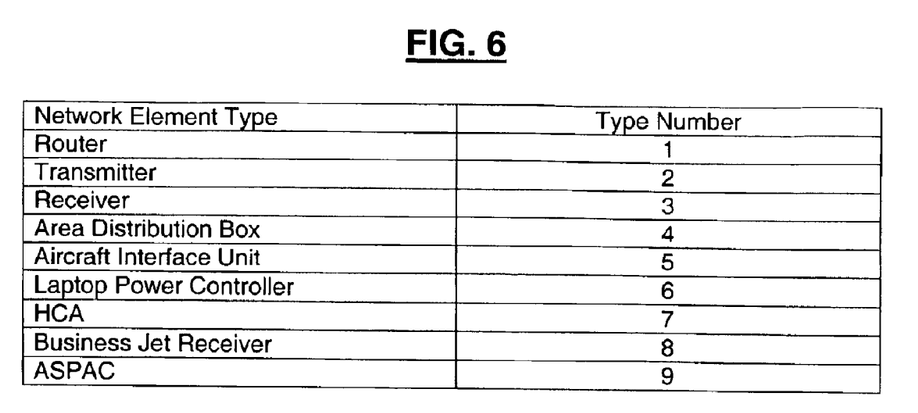
FIG. 6 is a table that defines a relationship between onboard network elements and type numbers.

The network element address is the CCN address of the devices that provides network services, excluding servers or SEBs, to the PSN 100. This includes routers, transmitters, receivers, ADBs, AIUs, Business Jet Receivers, ASPACs, HCAs or any other type of network element. This address is used for initialization and onboard control of the network elements and is not part of or accessible to the PSN 100. As with all CCN devices, the first bit is preferably unused and is set equal to 0. The next three bits are used to define the type of CCN device that is being addressed. In the case of a network element, the bit pattern is set to 001. To allow different types of network elements to be defined and identified by IP addresses, the next 7 bits are used to specify the type of network element that is being addressed (starting with a type of 1). The final octet allows up to 31 network elements to be defined for each type. The network element device number starts at 1. This is summarized as follows:

```
   [172.16]      [x-LLL-TTTTTTT-NNNNN]
16-Bits     1-Bit 3-Bits      7-Bits      5-Bits
   [172.16]      [OLLLTTTT.TTTNNNNN]
``` x=not used (always set to "0")
L=Command and Control Device Type (where "100"= Seatbox Element, "001"
=Network Element)
T=Network Element Type
N=Network Element Number
Subnet Mask: 255.255.0.0 (/16)

Passenger Services Network

The passenger services network (PSN) 100 is defined as the IP connectivity between the UCD 74 and the SEB 72. The PSN 100 preferably uses a Class B address with a 16-bit network number and a 16-bit host number. In a presently preferred embodiment, each port (Ethernet or USB) must be uniquely addressed. The IP addresses for the PSN 100 allow each port to be assigned its own address and a gateway address for the SEB 72. The address includes two Class B addresses that are super-netted together.

The first 15 bits make up the prefix. The next 4 bits define the ADB 68 that the SEB 72 is connected to. Up to 16 ADBs 68 can be described (the first ADB 68 starts with the number 0). The next 3 bits are used to define the column that the SEB 72 is connected to. Three bits allow up to 5 columns per ADB 68 to be addressed (the first column is addressed as 1). In addition, the column is not assigned the number 7 because there can never be more than 5 columns per ADB. 5 bits define the position of the SEB 72 with respect to its column. Five bits are allocated to allow up to 30 SEB 72 to be defined (the first SEB must be addressed as 1).

The address uniquely identifies the SEB 72 and can be used to summarize all routes reachable by this SEB 72. This significantly reduces the routing table of the airborne router 54. The next bit is used to identify whether the address belongs to a SEB 72 or to a UCD 74. The last four bits are used to specify the port that the address corresponds to. This number can range from 1 to 15 for SEBs 72 and from 18 to 30 for UCD 74 addresses. This is summarized as follows:

```
         [172.18]     [DDDD-CCC-BBBBB-U-PPPP]
         [172.19]
15-Bits  4-Bits      3-Bits    5-Bits   1-Bit   4-Bits
         [172.] [0001001D.DDDCCCBB.BBBUPPPP]
```

D=Area Distribution Box
C=Column
B=Seatbox
U=User (0 indicates seatbox address, 1 indicates passenger address)
P=Port
Subnet Mask: 255.254.0.0 (/15)

Server and Network Device Addresses

A special range of addresses on the PSN 100 is set aside for servers and network elements. As stated above, a column is not assigned the address 7. This allows the use of the address range 172.19.252.1 to 172.19.255.254 to address servers and network elements. This address range is further subdivided to specify that the address range 172.19.252.1 to 172.19.253.254 identifies a server element and the address range 172.19.254.1–172.19.255.254 identifies a network element.

These ranges are determined by looking at the bit patterns. The first two octets are set equal to 172.19. Then 6 bits are set to all 1's. Since a column does not have a bit pattern of all 1's, this bit pattern sets aside a range for servers and network devices. The next bit is used to specify whether the device that is addressed is a server or a network device. The last 9 bits uniquely identify the server or network device. This is summarized as follows:

```
   [172.19]     [111111-T-NNNNNNNNN]
16-Bits    6-Bit       1-Bit      9-Bits
         [172.] [19.111111TN]
```

T=Server or Network element indicator (0 indicates server address, 1 indicates network element address)
N=Device Number
Subnet Mask: 255.254.0.0 (/15)

Seat Element Devices

Seat element devices are defined as any IP addressable element that might be found in a seat such as IP telephones, video displays, audio devices, entertainment systems, or any other similar device. All devices participate on the 172.17.0.0, 255.255.0.0 network. The assignment of addresses is left to the provider of the IP addressable seat elements.

```
[172.17.] [To be assigned by seat element provider]
            16-Bits            16-Bits
Subnet Mask: 255.255.0.0 (/16)
```

As can be appreciated by the foregoing, the IP addressing scheme for mobile platforms according to the invention effectively and efficiently utilizes IP addressing space. Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method for assigning Internet Protocol addresses in a communications system for an aircraft, comprising the steps of:
   creating an air-to-ground network;
   assigning a first range of addresses to devices that are associated with said air-to-ground network;
   defining a network number and a host number in said first range of addresses; and
   dividing said host number into an aircraft number for subnetting and a device number.

2. The method of claim 1 wherein said first range of addresses are Class A IP addresses.

3. The method of claim 2 wherein said aircraft number includes 14-bits and said device number includes 10-bits.

4. The method of claim 1 further comprising the step of defining a command and control network on said aircraft.

5. The method of claim 4 further comprising the step of assigning a second range of addresses to devices that are associated with said command and control network.

6. The method of claim 5 wherein said second range of addresses are Class B IP addresses.

7. The method of claim 6 wherein said second range of addresses includes a network number and a host number.

8. The method of claim 7 wherein said host number includes a first group of bits that identify one of a seat electronic box device, a server element and a network element.

9. The method of claim 7 wherein said host number includes a second group of bits that identify an area distribution box.

10. The method of claim 9 wherein said host number includes a third group of bits that identify a column.

11. The method of claim 10 wherein said host number includes a fourth group of bits that identify a seat electronic box.

12. The method of claim 8 wherein said host number includes a fifth group of bits that identify a type of server that is to be addressed.

13. The method of claim 12 wherein said host number includes a sixth group of bits that identify a server device.

14. The method of claim 8 wherein said host number includes a seventh group of bits that identify a type of network that is to be addressed.

15. The method of claim 14 wherein said host number includes an eighth group of bits that identify a network device.

16. The method of claim 1 further comprising the step of defining a passenger services network on said aircraft.

17. The method of claim 1 further comprising the step of assigning a third range of addresses to devices that are associated with said passenger services network.

18. The method of claim 17 wherein said third range of addresses includes two Class B IP addresses that are supernetted together.

19. The method of claim 18 wherein said third range of addresses include a network number and a host number, and wherein said host number includes bits that identify an area distribution box, a column, a seatbox, a user, and a port.

20. The method of claim 1 further comprising the step of assigning a fourth range of addresses to seat element devices.

21. The method of claim 20 wherein said fourth range of addresses are Class B IP addresses.

22. The method of claim 19 wherein said third range of addresses include a network number and a host number, and wherein said host number includes bits that identify an area distribution box, a column, a seatbox, a user, and a port.

23. A method for assigning internet protocol addresses in a communications systems for an aircraft, comprising the steps of:
   creating an air-to-ground network (AGN), a passenger services network (PSN), and a command and control network (CCN);
   assigning a first range of addresses to a first group of devices that are associated with said AGN;
   assigning a second range of addresses to a second group of devices tat are associated with said PSN; and
   assigning a third range of addresses to a third group of devices that are associated with said CCN.

24. The method of claim 23 further comprising the steps of employing IP aliasing to allow at least one device from said first, second and third groups to be multi-homed.

25. The method of claim 24 further comprising the step of:
   defining a network number and a host number in said first range of addresses; and
   dividing said host number into an aircraft number for subnetting and a device number.

26. The method of claim 25 wherein said first range of addresses are Class A IP addresses, said aircraft number includes 14-bits, and said device number is a 10-bit number.

27. The method of claim 26 wherein said second range of addresses are Class B IP addresses and wherein said second range of addresses includes a network number and a host number.

28. The method of claim 27 wherein said host number includes a first group of bits that identify one of a seat electronic box device, a server element and a network element, a second group of bits that identify an area distribution box, and a third group of bits that identify a column.

29. The method of claim 28 wherein said host number includes a fourth group of bits that identify a seat electronic box.

30. The method of claim 23 wherein said host number includes a fifth group of bits that identify a type of server that is to be addressed and a sixth group of bits that identify a server device.

31. The method of claim 23 wherein said host number includes a seventh group of bits that identify a type of network that is to be addressed and an eighth group of bits that identify a network device.

32. The method of claim 23 further comprising the steps of assigning a third range of addresses to device that are associated with said PSN wherein said third range of addresses includes two Class B IP addresses that are supernetted together.

33. The method of claim 23 further comprising the steps of assigning a fourth range of addresses to seat element devices, wherein said fourth range of addresses are Class B IP addresses.

* * * * *